(12) United States Patent
Gao et al.

(10) Patent No.: US 10,778,292 B2
(45) Date of Patent: Sep. 15, 2020

(54) METHOD AND DEVICE FOR TRANSMITTING FEEDBACK INFORMATION

(71) Applicant: CHINA ACADEMY OF TELECOMMUNICATIONS TECHNOLOGY, Beijing (CN)

(72) Inventors: Qiubin Gao, Beijing (CN); Wenhong Chen, Beijing (CN); Hui Li, Beijing (CN); Runhua Chen, Beijing (CN); Rakesh Tamrakar, Beijing (CN)

(73) Assignee: CHINA ACADEMY OF TELECOMMUNCATIONS TECHNOLOGY, Beijing (CN)

( * ) Notice: Subject to any disclaimer, the term of this patent is extended or adjusted under 35 U.S.C. 154(b) by 71 days.

(21) Appl. No.: 16/082,908

(22) PCT Filed: Feb. 21, 2017

(86) PCT No.: PCT/CN2017/074282
§ 371 (c)(1),
(2) Date: Sep. 6, 2018

(87) PCT Pub. No.: WO2017/152750
PCT Pub. Date: Sep. 14, 2017

(65) Prior Publication Data
US 2019/0103902 A1    Apr. 4, 2019

(30) Foreign Application Priority Data
Mar. 11, 2016   (CN) .......................... 2016 1 0140780

(51) Int. Cl.
*H04B 7/04* (2017.01)
*H04B 7/0417* (2017.01)
(Continued)

(52) U.S. Cl.
CPC ......... *H04B 7/0417* (2013.01); *H04B 7/0478* (2013.01); *H04B 7/0486* (2013.01);
(Continued)

(58) Field of Classification Search
CPC .. H04B 7/0456; H04B 7/0478; H04B 7/0632; H04B 7/04; H04B 7/0417; H04B 7/0663;
(Continued)

(56) References Cited

U.S. PATENT DOCUMENTS

| 2010/0002598 A1 | 1/2010 | Pan et al. |
| 2011/0149765 A1 | 6/2011 | Gorokhov et al. |

(Continued)

FOREIGN PATENT DOCUMENTS

| CN | 102468947 A | 5/2012 |
| CN | 103840868 A | 6/2014 |

(Continued)

OTHER PUBLICATIONS

From CN application No. 201610140780.9, First Office Action dated May 25, 2018, with machine English translation from Global Dossier.

(Continued)

*Primary Examiner* — Rahel Guarino
(74) *Attorney, Agent, or Firm* — Ladas & Parry, LLP

(57) ABSTRACT

The present application provides a method and a device for transmitting feedback information. The method includes: determining, by a transmitting terminal, a first code book in accordance with a channel measurement result, precoding matrices included in the first code book being obtained through transformation of a same construction matrix; calculating, by the transmitting terminal, to obtain a first CQI in accordance with all or part of the precoding matrices in the first code book; and transmitting, by the transmitting terminal, first indication information for indicating the first
(Continued)

code book and second indication information for indicating the first CQI to a receiving terminal.

16 Claims, 3 Drawing Sheets

(51) Int. Cl.
*H04B 7/0456* (2017.01)
*H04B 7/06* (2006.01)

(52) U.S. Cl.
CPC ......... *H04B 7/0626* (2013.01); *H04B 7/0632* (2013.01); *H04B 7/0639* (2013.01)

(58) Field of Classification Search
CPC .. H04B 7/0413; H04B 7/0473; H04B 7/0621; H04B 17/309; H04L 1/0026; H04L 25/0391; H04L 25/03898; H04L 25/03942; H04L 5/0057
See application file for complete search history.

(56) References Cited

U.S. PATENT DOCUMENTS

| | | | |
|---|---|---|---|
| 2011/0249763 A1* | 10/2011 | Tosato | H04B 7/0641 375/260 |
| 2012/0020288 A1 | 1/2012 | Liu et al. | |
| 2013/0083758 A1 | 4/2013 | Kim et al. | |
| 2013/0215841 A1 | 8/2013 | Sun et al. | |
| 2013/0308715 A1 | 11/2013 | Nam et al. | |
| 2014/0138625 A1 | 5/2014 | Franklin et al. | |
| 2014/0254701 A1 | 9/2014 | Geirhofer et al. | |
| 2015/0117350 A1 | 4/2015 | Seo et al. | |
| 2016/0043789 A1 | 2/2016 | Wang et al. | |
| 2016/0072567 A1 | 3/2016 | Kim et al. | |

FOREIGN PATENT DOCUMENTS

| | | |
|---|---|---|
| CN | 104144007 A | 11/2014 |
| CN | 104396153 A | 3/2015 |
| JP | 2012532495 A | 12/2012 |
| JP | 2013529033 A | 7/2013 |
| TW | 201545494 A | 12/2015 |
| WO | 2014138625 A1 | 9/2014 |

OTHER PUBLICATIONS

From EP application No. 17762436.8, Extended European Search Report, dated Feb. 5, 2019.
From TW application No. 106106925, Office Action dated Apr. 19, 2018, with machine English translation from Google Translate.
From PCT/CN2017/074282, Written Opinion of the International Searching Authority, dated May 2, 2017, with English translation from WIPO.
From PCT/CN2017/074282, International Preliminary Report on Patentability, dated Sep. 11, 2018, with English translation from WIPO.
International Search Report for PCT/CN2017/074282 dated May 2, 2017 and its English translation provided by WIPO.
Written Opinion of the International Search Authority PCT/CN2017/074282 dated May 2, 2017 and its English translation provided by Google Translate.
Notice of Reasons for Refusal from JP app. No. 2018546805, dated Oct. 8, 2019, with English translation from Global Dossier.

* cited by examiner

METHOD AND DEVICE FOR TRANSMITTING FEEDBACK INFORMATION

CROSS-REFERENCE TO RELATED APPLICATIONS

The present application is the U.S. national phase of PCT Application No. PCT/CN2017/074282 filed on Feb. 21, 2017, which claims priority to the Chinese patent application No. 201610140780.9 filed on Mar. 11, 2016, both of which are incorporated herein by reference in their entireties.

TECHNICAL FIELD

The present disclosure relates to the field of communication technology, in particular to a method and a device for transmitting feedback information.

BACKGROUND

Closed-loop precoding techniques have been introduced into a Long Term Evolution (LTE) Release 8 (Rel-8) system to improve spectral efficiency. For the closed-loop precoding technique, it is required to store an identical set of precoding matrices both in a base station and a terminal in advance, and the set of precoding matrices is referred to as a code book. After estimating channel information in accordance with a cell common pilot, the terminal selects a precoding matrix from the code book in accordance with a predetermined criteria. The predetermined criteria may be maximization of mutual information or maximization of Signal-to-Interference plus Noise Ratio (SINR). An index of the selected precoding matrix in the code book is fed back by the terminal to the base station via an uplink channel, and the index is used as Precoding Matrix Indicator (PMI). The base station may determine the precoding matrix used by the terminal in accordance with the received PMI.

For the closed-loop precoding technique, a transmission parameter is selected on the basis of feedback information from the terminal, so in the case that the terminal moves at a high speed, the PMI fed back by the terminal may probably be invalid, i.e., it is not able to reflect a current channel state of the terminal. In this case, the transmission parameter may not match an actual channel condition, and a system performance may be deteriorated. To solve problems in a high-speed movement scenario, an open-loop Multiple Input Multiple Output (MIMO) transmission scheme has been introduced into the LTE Rel-8 system. For the open-loop MIMO transmission scheme, the terminal does not return the PMI any more, and instead, it is merely necessary for the terminal to return information about a Channel Quality Indicator (CQI) and a Rank Indicator (RI). When the terminal calculates the CQI and the RI, it is assumed that the terminal uses a pre-agreed precoding matrix on a resource involved in the data transmission.

In a word, it is impossible for the open-loop MIMO transmission scheme to adaptively adjust the transmission parameter in accordance with a channel change, so it is impossible to obtain a beamforming gain and a precoding gain. In addition, for a closed-loop MIMO transmission scheme, since the information fed back by the terminal is invalid in the case that the terminal moves at a high speed, the transmission parameter does not match the actual channel condition, which may cause the system performance to be deteriorated.

SUMMARY

Embodiments of the present disclosure provide a method and a device for transmitting feedback information, to solve problems in the related art that it is impossible for the open-loop MIMO transmission scheme to obtain a beamforming gain and a precoding gain due to the fact that the open-loop MIMO transmission scheme is incapable of adaptively adjusting the transmission parameter in accordance with a channel change, and it is impossible for the closed-loop MIMO transmission scheme to prevent the deterioration of the system performance in the case that the transmission parameter does not match the actual channel condition due to the invalid information returned by the terminal at a high speed.

In the first aspect, the present disclosure provides in some embodiments a method for transmitting feedback information, including:

determining, by a transmitting terminal, a first code book in accordance with a channel measurement result, where precoding matrices included in the first code book are obtained through transformation of a same construction matrix;

calculating, by the transmitting terminal, to obtain a first Channel Quality Indicator (CQI) in accordance with all or part of the precoding matrices in the first code book; and transmitting, by the transmitting terminal, first indication information for indicating the first code book and second indication information for indicating the first CQI to a receiving terminal.

In a possible embodiment of the present disclosure, the calculating, by the transmitting terminal, to obtain the first CQI in accordance with all or part of the precoding matrices in the first code book includes:

selecting, by the transmitting terminal, a precoding matrix for each Resource Element (RE) from the first code book as a first precoding matrix for the RE; and for each first sub-band, calculating, by the transmitting terminal, to obtain the first CQI corresponding to the first sub-band in accordance with the first precoding matrix for the RE included in the first sub-band.

In a possible embodiment of the present disclosure, the determining, by the transmitting terminal, the first code book in accordance with the channel measurement result includes:

selecting, by the transmitting terminal, a second precoding matrix from a predefined second code book in accordance with the channel measurement result; and taking, by the transmitting terminal, the second precoding matrix as the construction matrix, and determining the first code book in accordance with the second precoding matrix, where the first indication information is identification information of the second precoding matrix.

In a possible embodiment of the present disclosure, the determining, by the transmitting terminal, the first code book in accordance with the second precoding matrix includes:

performing, by the transmitting terminal, a column exchange on a column vector of the second precoding matrix, and determining a set of the matrices obtained through the column exchange as the first code book; and/or performing, by the transmitting terminal, a predetermined operation on the second precoding matrix with the matrices in a predetermined set of matrices, and determining a set of the matrices obtained through the predetermined operation as the first code book; and/or decomposing, by the transmitting terminal, the second precoding matrix into at least two component matrices, performing a predetermined operation on at least one of the at least two component matrices with the matrices in the predetermined set of matrices, and determining a set of the matrices obtained through the predetermined operation as the first code book.

In a possible embodiment of the present disclosure, the determining, by the transmitting terminal, the first code book in accordance with the channel measurement result includes:

selecting, by the transmitting terminal, a set of precoding matrices from a predefined set of precoding matrices in accordance with the channel measurement result, as the first code book, and where the first indication information is index information about the first code book in the predefined set of precoding matrices.

In a possible embodiment of the present disclosure, the determining, by the transmitting terminal, the first code book in accordance with the channel measurement result includes:

selecting, by the transmitting terminal, a set of precoding matrices from a predefined set of precoding matrices in accordance with the channel measurement result; and selecting, by the transmitting terminal, a sub-set of precoding matrices from the selected set of precoding matrices in accordance with the channel measurement result, and determining the selected sub-set of precoding matrices as the first code book, where the first indication information includes: index information about the selected set of precoding matrices in the predefined set of precoding matrices, and index information about the selected sub-set of precoding matrices in the selected set of precoding matrices.

In a possible embodiment of the present disclosure, the method further includes:

selecting, by the transmitting terminal, a precoding matrix from the first code book in accordance with the channel measurement result, as a third precoding matrix;

calculating, by the transmitting terminal, to obtain a second CQI in accordance with the third precoding matrix; and transmitting, by the transmitting terminal, identification information about the third precoding matrix and information about the second CQI to the receiving terminal.

In the second aspect, the present disclosure provides in some embodiments a method for receiving feedback information, including:

receiving, by a receiving terminal, indication information for indicating a first code book and indication information for indicating a first Channel Quality Indicator (CQI) from a transmitting terminal; and determining, by the receiving terminal, the first code book in accordance with the indication information for indicating the first code book, and determining the first CQI in accordance with the indication information for indicating the first CQI, where precoding matrices included in the first code book are obtained through transformation of a same construction matrix, and the first CQI is obtained by the transmitting terminal calculating in accordance with all or part of the precoding matrices in the first code book.

In a possible embodiment of the present disclosure, the indication information about the first code book is identification information for indicating a second precoding matrix, and the second precoding matrix is selected by the transmitting terminal from a predefined second code book in accordance with a channel measurement result; or the indication information about the first code book is index information about the first code book in a predefined set of precoding matrices; or the indication information about the first code book includes: index information about a set of precoding matrices selected by the transmitting terminal in the predefined set of precoding matrices, and index information about a sub-set of precoding matrices selected by the transmitting terminal in the selected set of precoding matrices.

In the third aspect, the present disclosure provides in some embodiments a device for transmitting feedback information, including:

a determination module configured to determine a first code book in accordance with a channel measurement result, where precoding matrices included in the first code book are obtained through transformation of a same construction matrix;

a calculation module configured to calculate to obtain a first Channel Quality Indicator (CQI) in accordance with all or part of the precoding matrices in the first code book; and a transmission module configured to transmit first indication information for indicating the first code book and second indication information for indicating the first CQI to a receiving terminal.

In a possible embodiment of the present disclosure, the calculation module is further configured to:

select a precoding matrix for each RE from the first code book as a first precoding matrix for the RE, and for each first sub-band, calculate to obtain the first CQI corresponding to the first sub-band in accordance with the first precoding matrix for the RE included in the first sub-band.

In a possible embodiment of the present disclosure, the determination module is further configured to select a second precoding matrix from a predefined second code book in accordance with the channel measurement result, take the second precoding matrix as the construction matrix, and determine the first code book in accordance with the second precoding matrix. The first indication information is identification information about the second precoding matrix.

In a possible embodiment of the present disclosure, the determination module is further configured to:

perform a column exchange on a column vector of the second precoding matrix, and determine a set of the matrices obtained through the column exchange as the first code book; and/or perform a predetermined operation on the second precoding matrix with the matrices in a predetermined set of matrices, and determine a set of the matrices obtained through the predetermined operation as the first code book; and/or decompose the second precoding matrix into at least two component matrices, perform a predetermined operation on at least one of the at least two component matrices with the matrices in the predetermined set of matrices, and determine a set of the matrices obtained through the predetermined operation as the first code book.

In a possible embodiment of the present disclosure, the determination module is further configured to select a set of precoding matrices from the predefined set of precoding matrices in accordance with the channel measurement result, as the first code book. The first indication information is index information about the first code book in the predefined set of precoding matrices.

In a possible embodiment of the present disclosure, the determination module is further configured to: select a set of precoding matrices from a predefined set of precoding matrices in accordance with the channel measurement result; and select a sub-set of precoding matrices from the selected set of precoding matrices in accordance with the channel measurement result, and determine the selected sub-set of precoding matrices as the first code book. The first indication information includes index information about the selected set of precoding matrices in the predefined set of precoding matrices, and index information about the selected sub-set of precoding matrices in the selected set of precoding matrices.

In a possible embodiment of the present disclosure, the calculation module is further configured to select a precoding matrix from the first code book in accordance with the channel measurement result, as a third precoding matrix, and calculate to obtain a second CQI in accordance with the third precoding matrix. The transmission module is further configured to transmit identification information about the third precoding matrix and information about the second CQI to the receiving terminal.

In fourth aspect, the present disclosure provides in some embodiments a terminal, including a transmitter and at least one processor connected to the transmitter. The processor is configured to read a program stored in a memory and configured to perform the following processes:

determining a first code book in accordance with a channel measurement result, where precoding matrices comprised in the first code book are obtained through transformation of a same construction matrix; calculating to obtain a first CQI in accordance with all or part of the precoding matrices in the first code book; and transmitting, through the transmitter, first indication information for indicating the first code book and second indication information for indicating the first CQI to a receiving terminal.

In a possible embodiment of the present disclosure, the processor is further configured to select a precoding matrix for each RE from the first code book as a first precoding matrix for the RE, and for each first sub-band, calculate to obtain the first CQI corresponding to the first sub-band in accordance with the first precoding matrix for the RE included in the first sub-band.

In a possible embodiment of the present disclosure, the processor is further configured to select a second precoding matrix from a predefined second code book in accordance with the channel measurement result, take the second precoding matrix as the construction matrix, and determine the first code book in accordance with the second precoding matrix. The first indication information is identification information about the second precoding matrix.

In a possible embodiment of the present disclosure, the processor is further configured to:

perform a column exchange on a column vector of the second precoding matrix, and determine a set of the matrices obtained through the column exchange as the first code book; and/or perform a predetermined operation on the second precoding matrix with the matrices in a predetermined set of matrices, and determine a set of the matrices obtained through the predetermined operation as the first code book; and/or decompose the second precoding matrix into at least two component matrices, perform a predetermined operation on at least one of the at least two component matrices with the matrices in the predetermined set of matrices, and determine a set of the matrices obtained through the predetermined operation as the first code book.

In a possible embodiment of the present disclosure, the processor is further configured to select a set of precoding matrices from the predefined set of precoding matrices in accordance with the channel measurement result, as the first code book. The first indication information is index information about the first code book in the predefined set of precoding matrices.

In a possible embodiment of the present disclosure, the processor is further configured to: select a set of precoding matrices from a predefined set of precoding matrices in accordance with the channel measurement result; and select a sub-set of precoding matrices from the selected set of precoding matrices in accordance with the channel measurement result, and determine the selected sub-set of precoding matrices as the first code book. The first indication information includes index information about the selected set of precoding matrices in the predefined set of precoding matrices, and index information about the selected sub-set of precoding matrices in the selected set of precoding matrices.

In a possible embodiment of the present disclosure, the processor is further configured to select a precoding matrix from the first code book in accordance with the channel measurement result, as a third precoding matrix, calculate to obtain a second CQI in accordance with the third precoding matrix, and transmit, through the transmitter, identification information about the third precoding matrix and information about the second CQI to the receiving terminal.

In the fifth aspect, the present disclosure provides in some embodiments a device for receiving feedback information, including:

a reception module configured to receive indication information for indicating a first code book and indication information for indicating a first Channel Quality Indicator (CQI) from a transmitting terminal; and a determination module configured to determine the first code book in accordance with the indication information for indicating the first code book, and determine the first CQI in accordance with the indication information for indicating the first CQI, where precoding matrices included in the first code book are obtained through transformation of a same construction matrix, and the first CQI is obtained by the transmitting terminal calculating in accordance with all or part of the precoding matrices in the first code book.

A specific implementation manner of the indication information about the first code book refers to the related description in the first aspect, which is not repeated herein.

In the sixth aspect, the present disclosure provides in some embodiments a base station, including a receiver and at least one processor connected to the receiver. The processor is configured to read a program stored in a memory and configured to perform the following processes:

receiving, through the receiver, indication information for indicating a first code book and indication information for indicating a first CQI from a transmitting terminal; and determining the first code book in accordance with the indication information about the first code book, and determining the first CQI in accordance with the indication information about the first CQI, where precoding matrices included in the first code book are obtained through transformation of a same construction matrix, and the first CQI is obtained by the transmitting terminal calculating in accordance with all or part of the precoding matrices in the first code book.

A specific implementation manner of the indication information about the first code book refers to the related description in the first aspect, which is not repeated herein.

In the seventh aspect, the present disclosure provides in some embodiments a device for transmitting feedback information, including a transmitter and at least one processor connected to the transmitter. The processor is configured to read a program stored in a memory and perform the following processes: determining a first code book in accordance with a channel measurement result, where precoding matrices included in the first code book are obtained through transformation of a same construction matrix; calculating to obtain a first Channel Quality Indicator (CQI) in accordance with all or part of the precoding matrices in the first code book; and transmitting, through the transmitter, first indication information for indicating the first code book and second indication information for indicating the first CQI to a receiving terminal.

In the eighth aspect, the present disclosure provides in some embodiments a device for receiving feedback information, including a receiver and at least one processor connected to the receiver. The processor is configured to read a program stored in a memory and perform the following processes: receiving, through the receiver, indication information for indicating a first code book and indication information for indicating a first CQI from a transmitting terminal; and determining the first code book in accordance with the indication information about the first code book, and determining the first CQI in accordance with the indication information for indicating the first CQI. Precoding matrices included in the first code book are obtained through transformation of a same construction matrix, and the first CQI is calculated by the transmitting terminal in accordance with all or part of the precoding matrices in the first code book.

According to the method and device in the embodiments of the present disclosure, the transmitting terminal determines the first code book in accordance with the channel measurement result, so the determined first code book is related to a channel, i.e., a closed-loop precoding technique is adopted. When data is transmitted by the receiving terminal, it is able for the receiving terminal to adaptively adjust a transmission parameter in accordance with a channel change, thereby obtaining a beamforming gain and a precoding gain. The transmitting terminal calculates to obtain the first CQI in accordance with all or part of the precoding matrices in the first code book, and feeds the first CQI back to the receiving terminal, i.e., an open-loop precoding technique is adopted. In the case that the data is transmitted in a scenario where the terminal moves at a high speed, it is able to ensure the obtained channel state information to match an actual channel state, thereby preventing the system performance from being deteriorated. Since the closed-loop precoding technique and the open-loop precoding technique are combined in the embodiments of the present application, it is able to improve the system performance. In addition, the precoding matrices included in the first code book are obtained through transformation of the same construction matrix, so beams formed by each of the precoding matrices in the first code book are oriented in a substantially identical direction. As a result, a beamforming gain may be further obtained, and the system performance may be further improved.

BRIEF DESCRIPTION OF THE DRAWINGS

In order to illustrate the technical solutions of the present disclosure or the related art in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort. Shapes and sizes of the members in the drawings are for illustrative purposes only, but shall not be used to reflect any actual scale.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
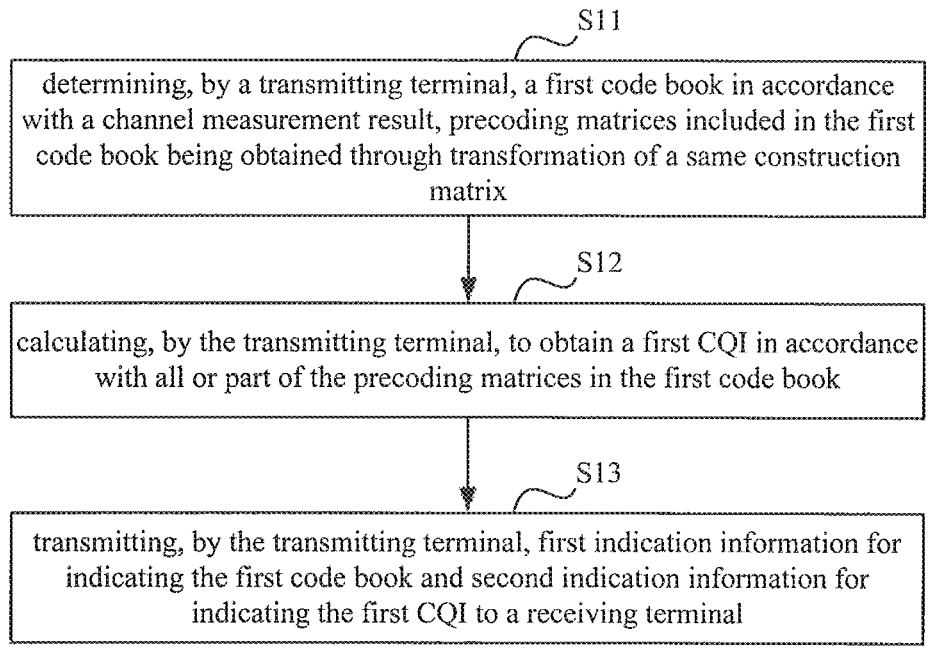
FIG. 1 is a schematic diagram of a method for transmitting feedback information according to some embodiments of the present disclosure.

The present disclosure provides in some embodiments a method for transmitting feedback information. As shown in FIG. 1, the method includes:

step S11 of determining, by a transmitting terminal, a first code book in accordance with a channel measurement result, precoding matrices included in the first code book being obtained through transformation of a same construction matrix;

step S12 of calculating, by the transmitting terminal, to obtain a first CQI in accordance with all or part of the precoding matrices in the first code book;

and step S13 of transmitting, by the transmitting terminal, first indication information for indicating the first code book and second indication information for indicating the first CQI to a receiving terminal.

In step S13, an order of the first indication information and the second indication information will not be particularly defined. To be specific, the first indication information and the second indication information may be transmitted simultaneously subsequent to step S12; or the first indication information may be transmitted after the determining the first code book in step S11 and then the second indication information may be transmitted after the calculating to obtain the first CQI in step S12.

According to the method in the embodiments of the present disclosure, the transmitting terminal determines the first code book in accordance with the channel measurement result, so the determined first code book is related to a channel, i.e., a closed-loop precoding technique is adopted. When data is transmitted by the receiving terminal, it is able for the receiving terminal to adaptively adjust a transmission parameter in accordance with a channel change, thereby obtaining a beamforming gain and a precoding gain. The transmitting terminal calculates to obtain the first CQI in accordance with all or part of the precoding matrices in the first code book, and feeds the first CQI back to the receiving terminal, i.e., an open-loop precoding technique is adopted. Therefore, in the case that the data is transmitted in a scenario where the terminal moves at a high speed, it is able to ensure obtained channel state information to match an actual channel state, thereby preventing a system performance from being deteriorated. Since the closed-loop precoding technique and the open-loop precoding technique are combined in the embodiments of the present application, it is able to improve the system performance. In addition, the precoding matrices included in the first code book are obtained through transformation of the same construction matrix, so beams formed by each of the precoding matrices in the first code book are oriented in a substantially identical direction. As a result, a beamforming gain may be further obtained, and the system performance may be further improved.

In the embodiments of the present disclosure, the determining, by the transmitting terminal, the first code book in accordance with the channel measurement result may be implemented in the following two possible modes including mode 1 and mode 2.

Mode 1: the transmitting terminal may select a second precoding matrix from a predefined second code book in accordance with the channel measurement result, take the second precoding matrix as the construction matrix, and determine the first code book in accordance with the second precoding matrix.

The second code book is pre-agreed and stored in each of the transmitting terminal and the receiving terminal, or determined by the transmitting terminal and notified to the receiving terminal via signaling, or determined by the receiving terminal and notified by the transmitting terminal via signaling.

In this mode, the first indication information about the first code book is used as identification information about the second precoding matrix.

In this mode, the transmitting terminal may determine a dimension of the second precoding matrix in accordance with Rank Indicator (RI) information obtained through a channel measurement, select the second code book which includes the precoding matrices having a same dimension with the determined dimension, and then select a precoding matrix in the selected second code book as the second precoding matrix.

To be specific, in the case that the transmitting terminal determines the dimension of the second precoding matrix in accordance with the RI obtained through the channel measurement, and the second precoding matrix is a column vector, the transmitting terminal may determine a length of the second precoding matrix in accordance with a mapping relationship between the RI and the length of the second precoding matrix.

For example, in the case that the second precoding matrix is a vector, a possible mapping relationship between the RI and the length of the second precoding matrix is shown in Table 1.

TABLE 1

| RI | Length L of second precoding matrix |
|---|---|
| 1 | M/2 |
| 2 | M/2 |
| 3 | M/4 |

TABLE 1-continued

| RI | Length L of second precoding matrix |
|---|---|
| 4 | M/4 |
| 5 | M/8 |
| 6 | M/8 |
| 7 | M/8 |
| 8 | M/8 |

In Table 1, M represents the quantity of CSI-RS antenna ports and M=8, 16, 32 or 64.

In the case that the second precoding matrix is a block diagonal matrix, the transmitting terminal determines the quantity of rows of the second precoding matrix as the quantity of the CSI-RS antenna ports, and determines the quantity of columns of the second precoding matrix in accordance with a mapping relationship between the RI and the quantity of columns of the second precoding matrix.

For example, in the case that the second precoding matrix is a diagonal matrix, for example, $$U_2 = \begin{bmatrix} X_1 & 0 & 0 & 0 \\ 0 & X_2 & 0 & 0 \\ 0 & 0 & \ddots & 0 \\ 0 & 0 & 0 & X_C \end{bmatrix},$$

a possible mapping relationship between the RI and the quantity of columns of the second precoding matrix is shown in Table 2.

TABLE 2

| RI | The quantity of columns (C) of second precoding matrix |
|---|---|
| 1 | 2 |
| 2 | 2 |
| 3 | 4 |
| 4 | 4 |
| 5 | 8 |
| 6 | 8 |
| 7 | 8 |
| 8 | 8 |

$X_1, X_2, X_3, \ldots X_C$ may each represent a column vector having a length of M/C, or $X_1, X_2, X_3, \ldots X_C$ may represent a matrix having M/C rows and $N_b$ columns. M represents the quantity of the CSI-RS antenna ports.

Further, in the case of selecting the precoding matrix from the second code book as the second precoding matrices, it is assumed by the transmitting terminal that the second precoding matrix may be applied to all Resource Elements (REs) in a second sub-band. The second precoding matrix selected by the transmitting terminal is a precoding matrix in the second code book which matches a channel measurement of a first sub-band to the maximum extent.

To be specific, the transmitting terminal may determine a precoding matrix in the second code book having a minimum average distance from channel matrices of the REs in the first sub-band as the second precoding matrix; or the transmitting terminal may determine a data volume capable of being supported in the case that the receiving terminal performs data transmission using each precoding matrix in the second code book, and determine a precoding matrix corresponding to a maximum data volume as the second precoding matrix.

For example, a channel matrix on a $k^{th}$ RE in the first sub-band estimated by the transmitting terminal is $H_k$ having Nr*M columns, $H_k[i,j]$ represents an element in an $i^{th}$ row and a $j^{th}$ column $H_k$, i.e., a complex channel coefficient of a channel from a $j^{th}$ antenna of the receiving terminal to an $i^{th}$ antenna of the transmitting terminal, and $H_k^{[m_1,m_2]}$ represents a matrix consisting of an $(m1)^{th}$ column to an $(m2)^{th}$ column of $H_k$. The second precoding matrix may be obtained by calculating through the following formula:

$$\arg\max_{V \in B} V^H \sum_{k \in S} \left( \sum_{c=1}^{C} [H_k^{[(c-1)L+1,cL]}]^H H_k^{[(c-1)L+1,cL]} \right) V$$

where c=1, . . . , C, LC=M, S represents a set of the REs in the first sub-band, and B represents the second code book.

In this mode, for periodical feedback information, the transmitting terminal may, within each period, select the second precoding matrix from the predefined second code book in accordance with the channel measurement result, take the second precoding matrix as the construction matrix, and determine the first code book in accordance with the second precoding matrix.

In this mode, the second sub-band is the same as the first sub-band, or the second sub-band includes at least two first sub-bands. In the case that the second sub-band includes at least two first sub-bands, the transmitting terminal may determine the first precoding matrix for each resource in each of the first sub-bands included in the second sub-band.

In this mode, the transmitting terminal may determine the first code book in accordance with the second precoding matrix in the following three possible modes including: mode a, mode b and mode c.

Mode a: the transmitting terminal may perform a column exchange on the column vectors in the second precoding matrix, and determine a set of matrices obtained through the column exchange as the first code book.

To be specific, a plurality of matrices may be obtained on the basis of the second precoding matrix through different column exchange ways, and a set of the resultant matrices may be determined as the first code book.

For example, any one column of the second precoding matrix may be exchanged with the other columns, so as to obtain a plurality of matrices. For another example, any two columns of the second precoding matrix may be exchanged with the other columns, so as to obtain a plurality of matrices. For yet another example, any three columns of the second precoding matrix may be exchanged with the other columns, so as to obtain a plurality of matrices. Of course, a combination of the above ways may be adopted. For example, any one column of the second precoding matrix may be exchanged with the other columns so as to obtain a plurality of matrices, then any two columns of the second precoding matrix may be exchanged with the other columns so as to obtain a plurality of matrices, and a set of all the resultant matrices are determined as the first code book.

Mode b: the transmitting terminal may perform a predetermined operation on the second precoding matrix with the matrices in a predetermined set of matrices, and determine a set of the resultant matrices obtained through the predetermined operation as the first code book.

For example, the precoding matrices in the first code book may be expressed as $W_n=GZ_n$ or $W_n=G \otimes Z_n$, where n=1, 2, . . . , N, G represents the second precoding matrix, and $Z_n$ represents any matrix in the predetermined set of matrices.

Mode c: the transmitting terminal decomposes the second precoding matrix into at least two component matrices, performs a predetermined operation on at least one of the at least two component matrices with the matrices in the predetermined set of matrices, and determines a set of the resultant matrices obtained through the predetermined operation as the first code book.

For example, the second precoding matrix may be decomposed as G=UV, and the precoding matrices in the first code book may be expressed as $W_n=VZ_n$ or $W_n=UZ_n$, where n=1, 2, . . . , N, and $Z_n$ represents any matrix in the predetermined set of matrices.

For another example, the second precoding matrix may be decomposed as $G=U \otimes V$ and the precoding matrices in the first code book may be expressed as $W_n$ $V \otimes Z_n$ or $W_n=U \otimes Z_n$, where n=1, 2, . . . , N, and $Z_n$ represents any matrix in the predetermined set of matrices.

Of course, the first code book may also be determined using a combination of the above-mentioned three modes. For example, a set of matrices may be obtained using mode b, then the column exchange may be performed on each matrix in the set of matrices using mode a, and then all the matrices in the set obtained using mode b and all the matrices obtained through the column exchange may form the first code book. The first code book may also be determined using any other mode, but not limited to the above-mentioned three modes.

Mode 2: the transmitting terminal selects a set of precoding matrices from the predefined set of precoding matrices in accordance with the channel measurement result.

In this mode, the first indication information is index information about the first code book in the predefined set of precoding matrices.

Mode 3: the transmitting terminal selects a set of precoding matrices from the predefined set of precoding matrices in accordance with the channel measurement result, selects a sub-set of precoding matrices from the selected set of precoding matrices in accordance the channel measurement result, and determines the selected sub-set of precoding matrices as the first code book.

In this mode, the indication information about the first code book includes index information about the selected set of precoding matrices in the predefined set of precoding matrices, and index information about the selected sub-set of precoding matrices in the selected set of precoding matrices.

In this mode, the channel measurement result used in the case of selecting the set of precoding matrices may be the same as or different from the channel measurement result used in the case of selecting the sub-set of precoding matrices. For example, the channel measurement result may be obtained within different time periods or obtained with respect to different bandwidths.

In a possible embodiment of the present disclosure, the calculating, by the transmitting terminal, to obtain the first CQI in accordance with all or part of the precoding matrices in the first code book includes:

selecting, by the transmitting terminal, a precoding matrix for each RE from the first code book as a first precoding matrix for the RE; and with respect to each first sub-band, calculating, by the transmitting terminal, to obtain the first CQI corresponding to the first sub-band in accordance with the first precoding matrix for the RE included in the first sub-band.

To be specific, the terminal may determine the first precoding matrix for each RE in accordance with a certain criteria, and the first precoding matrices corresponding to different REs may be different from each other. Then, with respect to each first sub-band, the terminal may calculate channel quality information, i.e., the first CQI, under the assumption that the base station transmits the data to the terminal using the determined first precoding matrices on each RE in the first sub-band.

For example, in the case of selecting the first precoding matrix for each RE from the first code book, the transmitting terminal may select one precoding matrix from the first code book as the first precoding matrix in accordance with serial numbers of the REs included in the first sub-band. For example, the first code book includes N precoding matrices, whose serial numbers are 0, 1, . . . , N−1, and the first sub-band includes K REs, whose serial numbers are i.e., 0, 1, . . . , K−1. The first precoding matrix for a $k^{th}$ RE is an $n^{th}$ precoding matrix in the first code book, where k mod N, and mod represents a modular operation. For another example, the first precoding matrix for the $k^{th}$ RE is the $n^{th}$ precoding matrix in the first code book, where n=ceil (k/v)mod N, ceil (k/v) represents a minimum integer greater than or equal to k/v, and v represents a positive integer. In a possible embodiment of the present disclosure, v may represent the quantity of layers of a data stream, the quantity of antenna ports of the transmitting terminal, or the quantity of REs included in one resource block.

The resource block may be a Physical Resource Block (PRB), a sub-band, a part of a PRB in an LTE system, or the like.

It should be appreciated that, for periodical feedback information, the first CQI may be obtained by calculating in accordance with the first code book including the second precoding matrices lately determined by the terminal.

In a possible embodiment of the present disclosure, the method further includes: selecting, by the transmitting terminal, a precoding matrix from the first code book in accordance with the channel measurement result, as a third precoding matrix; calculating, by the transmitting terminal, to obtain a second CQI in accordance with the third precoding matrix; and transmitting, by the transmitting terminal, identification information about the third precoding matrix and information about the second CQI to the receiving terminal.

To be specific, the third precoding matrix selected by the transmitting terminal from the first code book in accordance with the channel measurement result is used for all resources in one sub-band, i.e., all the resources in one sub-band correspond to the same third precoding matrix.

In a possible embodiment of the present disclosure, the identification information about the third precoding matrix may be index information about the third precoding matrix in the first code book.

The transmitting terminal (e.g., the terminal) has reported the first CQI and the second CQI, so the receiving terminal (e.g., the base station) may flexibly select the transmission parameter in accordance with the first CQI or the second CQI during the data transmission. For example, the transmitting terminal may report the first CQI prior to the second CQI. In the case that the receiving terminal is to transmit the data to the transmitting terminal immediately upon the receipt of the second CQI, the receiving terminal may select the transmission parameter in accordance with the second CQI. In the case that the receiving terminal is to transmit the data to the transmitting terminal after a relatively long time period when the receipt of the second CQI, the receiving terminal may select the transmission parameter in accordance with the first CQI.

In a possible embodiment of the present disclosure, the information for indicating the second CQI may be the second CQI, or a difference between the second CQI and the first CQI.

Correspondingly, the first indication information may be the first CQI, or a difference between the first CQI and the second CQI.

The resultant first code book will be described hereinafter by taking the above mode 3 as an example.

1. In some embodiments where RI=2, each predefined set of precoding matrices (represented by second PMI i2) includes a plurality of sub-sets of precoding matrices (represented by first PMI i1), and each sub-set of precoding matrices includes two precoding matrices. A possible construction matrix for the sub-set of precoding matrices corresponding to the first PMI i1 and the second PMI i2 may be expressed as $$G = \begin{bmatrix} v_{2i_2+i_1} & 0 \\ 0 & v_{2i_2+i_1} \end{bmatrix},$$

and it is defined that $$Z_n = \begin{bmatrix} 1 & 1 \\ \phi_n & -\phi_n \end{bmatrix}, n = 0, 1.$$

At this time, the matrices in the sub-set of precoding matrices corresponding to the first PMI i1 and the second PMI i2 may include $GZ_0$ and $GZ_1$ (here, a power normalization factor is omitted). A possible form of the first code book formed on the basis of G may be shown in Table 3.

TABLE 3

| | | $i_1$ | | | | | | |
|---|---|---|---|---|---|---|---|---|
| | | 0 | | 1 | | 2 | | 3 |
| | | $i_3$ | | $i_3$ | | $i_3$ | | $i_3$ |
| $i_2$ | 0 | 1 | 0 | 1 | 0 | 1 | 0 | 1 |
| 0-15 | $W_{2i_2,2i_2,0}^{(2)}$ | $W_{2i_2,2i_2,1}^{(2)}$ | $W_{2i_2+1,2i_2+1,0}^{(2)}$ | $W_{2i_2+1,2i_2+1,1}^{(2)}$ | $W_{2i_2+2,2i_2+2,0}^{(2)}$ | $W_{2i_2+2,2i_2+2,1}^{(2)}$ | $W_{2i_2+3,2i_2+3,0}^{(2)}$ | $W_{2i_2+3,2i_2+3,1}^{(2)}$ | where $W_{m,m',n}^{(2)} = \frac{1}{4}\begin{bmatrix} v_m & v_{m'} \\ \varphi_n v_m & -\varphi_n v_{m'} \end{bmatrix}$, and $$\phi_n = e^{j\pi n}$$

$$v_m = [\,1 \quad e^{j2\pi m/32} \quad e^{j4\pi m/32} \quad e^{j6\pi m/32}\,]^T$$

In Table 3, a length of a column vector $v_m$ is 4, and the quantity of the corresponding CSI-RS ports is 8. Depending on the quantity of the CSI-RS ports and the form of the first code book, the length of the column vector $v_m$ may be of any other values.

2. In some embodiments where RI=2, each predefined set of precoding matrices includes a plurality of sub-sets of precoding matrices, and each sub-set of precoding matrices includes two precoding matrices. The sub-set of precoding matrices is represented by first PMI i1. A possible construction matrix for the sub-set of precoding matrices corresponding to the first PMI i1 may be expressed as $$G = \begin{bmatrix} v_{i_1} & 0 \\ 0 & v_{i_1} \end{bmatrix},$$

and it is defined that $$Z_n = \begin{bmatrix} 1 & 1 \\ \phi_n & -\phi_n \end{bmatrix}, n = 0, 1.$$

At this time, the precoding matrices in the sub-set of precoding matrices corresponding to the first PMI i1 may include $GZ_0$ and $GZ_1$ (here, the power normalization factor is omitted). A possible form of the first code book formed on the basis of G may be shown in Table 4.

TABLE 4

| | $i_3$ | |
|---|---|---|
| $i_1$ | 0 | 1 |
| 0-31 | $W_{i_1,0}^{(2)}$ | $W_{i_1,1}^{(2)}$ |

TABLE 4-continued where $W_{m,n}^{(2)} = \frac{1}{4}\begin{bmatrix} v_m & v_m \\ \phi_n v_m & -\phi_n v_m \end{bmatrix}$, and $\phi_n = e^{j\pi n}$ $v_m = [\,1\ \ e^{j2\pi m/32}\ \ e^{j4\pi m/32}\ \ e^{j6\pi m/32}\,]^T$ 3. In some embodiments where RI=2, each predefined set of precoding matrices (represented by second PMI i2) includes a plurality of sub-sets of precoding matrices (represented by first PMI i1), and each sub-set of precoding matrices includes two precoding matrices. A possible construction matrix for the sub-set of precoding matrices corresponding to the first PMI i1 and the second PMI i2 may be expressed as $$G = \begin{bmatrix} v_m & 0 & v_{m'} & 0 \\ 0 & v_m & 0 & v_{m'} \end{bmatrix},$$

and it is defined that $$Z_n = \begin{bmatrix} 1 & 0 \\ \phi_n & 0 \\ 0 & 1 \\ 0 & -\phi_n \end{bmatrix},$$

where, n=0,1. At this time, the matrices in the sub-set of precoding matrices corresponding to the first PMI i1 and the second PMI i2 may include $GZ_0$ and $GZ_1$ (here, the power normalization factor is omitted). A possible form of the first code book formed on the basis of G may be shown in Table 5.

TABLE 5

| | | | $i_1$ | | | | | |
|---|---|---|---|---|---|---|---|---|
| | 0 | | 1 | | 2 | | 3 | |
| | $i_3$ | | $i_3$ | | $i_3$ | | $i_3$ | |
| $i_2$ | 0 | 1 | 0 | 1 | 0 | 1 | 0 | 1 |
| 0-15 | $W_{2i_2,2i_2,0}^{(2)}$ | $W_{2i_2,2i_2,1}^{(2)}$ | $W_{2i_2+1,2i_2+1,0}^{(2)}$ | $W_{2i_2+1,2i_2+1,1}^{(2)}$ | $W_{2i_2+2,2i_2+2,0}^{(2)}$ | $W_{2i_2+2,2i_2+2,1}^{(2)}$ | $W_{2i_2+3,2i_2+3,0}^{(2)}$ | $W_{2i_2+3,2i_2+3,1}^{(2)}$ |
| | | | $i_1$ | | | | | |
| | 4 | | 5 | | 6 | | 7 | |
| | $i_3$ | | $i_3$ | | $i_3$ | | $i_3$ | |
| $i_2$ | 0 | 1 | 0 | 1 | 0 | 1 | 0 | 1 |
| 0-15 | $W_{2i_2,2i_2,+1,0}^{(2)}$ | $W_{2i_2,2i_2,1,1}^{(2)}$ | $W_{2i_2+1,2i_2+3,0}^{(2)}$ | $W_{2i_2+1,2i_2+3,1}^{(2)}$ | $W_{2i_2+2,2i_2+2,0}^{(2)}$ | $W_{2i_2+2,2i_2+2,1}^{(2)}$ | $W_{2i_2+3,2i_2+2,0}^{(2)}$ | $W_{2i_2+3,2i_2+2,1}^{(2)}$ | where $W_{m,m',n}^{(2)} = \frac{1}{4}\begin{bmatrix} v_m & v_{m'} \\ \varphi_n v_m & -\varphi_n v_{m'} \end{bmatrix}$, and $\phi_n = e^{j\pi n}$ $v_m = [\,1\ \ e^{j2\pi m/32}\ \ e^{j4\pi m/32}\ \ e^{j6\pi m/32}\,]^T$ 4. In some embodiments where RI=4, each predefined set of precoding matrices (represented by second PMI i2) includes a plurality of sub-sets of precoding matrices (represented by first PMI i1), and each sub-set of precoding matrices includes two precoding matrices. A possible construction matrix for the sub-set of precoding matrices corresponding to the first PMI i1 and the second PMI i2 may be expressed as $G=v_{2i_2+\eta}$ (column vector). The precoding matrices in the sub-set of precoding matrices corresponding to the first PMI i1 and the second PMI i2 may include $Z_0 \otimes G$ and $Z_1 \otimes G$ (here, the power normalization factor is omitted). A possible form of the first code book formed on the basis of G may be shown in Table 6.

TABLE 6

| | $i_1$ | | | | | | | |
|---|---|---|---|---|---|---|---|---|
| | 0 | | 1 | | 2 | | 3 | |
| | $i_3$ | | $i_3$ | | $i_3$ | | $i_3$ | |
| $i_2$ | 0 | 1 | 0 | 1 | 0 | 1 | 0 | 1 |
| 0-15 | $W^{(4)}_{2i_2,0}$ | $W^{(4)}_{2i_2,1}$ | $W^{(4)}_{2i_2+1,0}$ | $W^{(4)}_{2i_2+1,1}$ | $W^{(4)}_{2i_2+2,0}$ | $W^{(4)}_{2i_2+2,1}$ | $W^{(4)}_{2i_2+3,0}$ | $W^{(4)}_{2i_2+3,1}$ | where $W^{(4)}_{m,n} = \frac{1}{\sqrt{32}} Z_n \otimes v_m$, and $v_m = [\ 1\quad e^{j2\pi m/32}\ ]^T$ In Table 6, $Z_n$ is selected from the predefined set of precoding matrices, as shown in the following table.

| n | $Z_n$ |
|---|---|
| 0 | $\begin{bmatrix} 1 & 1 & 1 & -1 \\ 1 & 1 & -1 & 1 \\ 1 & -1 & 1 & 1 \\ -1 & 1 & 1 & 1 \end{bmatrix}$ |
| 1 | $\begin{bmatrix} 1 & 1 & -1 & 1 \\ 1 & 1 & 1 & -1 \\ -1 & 1 & 1 & 1 \\ 1 & -1 & 1 & 1 \end{bmatrix}$ |
| 2 | $\begin{bmatrix} 1 & -1 & 1 & 1 \\ -1 & 1 & 1 & 1 \\ 1 & 1 & 1 & -1 \\ 1 & 1 & -1 & 1 \end{bmatrix}$ |
| 3 | $\begin{bmatrix} 1 & -1 & -1 & -1 \\ -1 & 1 & -1 & -1 \\ -1 & -1 & 1 & -1 \\ -1 & -1 & -1 & 1 \end{bmatrix}$ |

5. In some embodiments where RI=4, each predefined set of precoding matrices (represented by second PMI i2) includes a plurality of sub-sets of precoding matrices (represented by first PMI i1), and each sub-set of precoding matrices includes two precoding matrices. A possible construction matrix for the sub-set of precoding matrices corresponding to the first PMI i1 and the second PMI i2 may be expressed as $$G = \begin{bmatrix} v_m & 0 & v_{m'} & 0 \\ 0 & v_m & 0 & v_{m'} \end{bmatrix},$$

and it is defined that $$Z_{n,n'} = \begin{bmatrix} 1 & 1 & 0 & 0 \\ \phi_n & -\phi_n & 0 & 0 \\ 0 & 0 & 1 & 1 \\ 0 & 0 & \phi_{n'} & -\phi_{n'} \end{bmatrix}, n = 0, 1, n' = 0, 1.$$

At this time, the matrices in the sub-set of precoding matrices corresponding to the first PMI i1 and the second PMI i2 may include $GZ_{0,0}$ and $GZ_{1,1}$ (here, the power normalization factor is omitted). A possible form of the first code book formed on the basis of G may be shown in Table 7.

TABLE 7

| | | | | | $i_1$ | | | | |
|---|---|---|---|---|---|---|---|---|---|
| | | 0 | | 1 | | 2 | | 3 | |
| | | $i_3$ | | $i_3$ | | $i_3$ | | $i_3$ | |
| $i_2$ | | 0 | 1 | 0 | 1 | 0 | 1 | 0 | 1 |
| 0-15 | | $W_{2i_2,2i_2,1,0,0}^{(4)}$ | $W_{2i_2,2i_2,1,1,1}^{(4)}$ | $W_{2i_2+1,2i_2+3,0,0}^{(4)}$ | $W_{2i_2+1,3i_2+3,1,1}^{(4)}$ | $W_{2i_2,2i_2,2,0,0}^{(4)}$ | $W_{2i_2,2i_2,2,1,1}^{(4)}$ | $W_{2i_2+1,2i_2+2,0,0}^{(4)}$ | $W_{2i_2+1,3i_2+2,1,1}^{(4)}$ | where $W_{m,m',n,n'}^{(4)} = \frac{1}{\sqrt{32}} \begin{bmatrix} v_m & v_m & v_{m'} & v_{m'} \\ \phi_n v_m & -\phi_n v_m & \phi_{n'} v_{m'} & -\phi_{n'} v_{m'} \end{bmatrix}$, and $\phi_n = e^{j\pi n}$ $v_m = [\, 1 \quad e^{j2\pi m/32} \quad e^{j4\pi m/32} \quad e^{j6\pi m/32} \,]^T$ 6. In some embodiments where RI=4, each predefined set of precoding matrices (represented by second PMI i2) includes a plurality of sub-sets of precoding matrices (represented by first PMI i1), and each sub-set of precoding matrices includes two precoding matrices. A possible construction matrix for the sub-set of precoding matrices corresponding to the first PMI i1 and the second PMI i2 may be expressed as $G = v_{2i_2+\eta}$ (column vector). At this time, the precoding matrices in the sub-set of precoding matrices corresponding to the first PMI i1 and the second PMI i2 may include $Z_0 \otimes G$ and $Z_1 \otimes G$ (here, the power normalization factor is omitted). A possible form of the first code book formed on the basis of G may be shown in Table 8.

TABLE 8

| | | | | $i_1$ | | | | |
|---|---|---|---|---|---|---|---|---|
| | 0 | | 1 | | 2 | | 3 | |
| | $i_3$ | | $i_3$ | | $i_3$ | | $i_3$ | |
| $i_2$ | 0 | 1 | 0 | 1 | 0 | 1 | 0 | 1 |
| 0-15 | $W_{2i_2,0}^{(4)}$ | $W_{2i_2,1}^{(4)}$ | $W_{2i_2+1,0}^{(4)}$ | $W_{2i_2+1,1}^{(4)}$ | $W_{2i_2+2,0}^{(4)}$ | $W_{2i_2+2,1}^{(4)}$ | $W_{2i_2+3,0}^{(4)}$ | $W_{2i_2+3,1}^{(4)}$ | where $W_{m,n}^{(4)} = \frac{1}{\sqrt{24}} Z_n \otimes v_m$, and $v_m = [\, 1 \quad e^{j2\pi m/32} \,]^T$ In Table 8, $Z_n$ is selected from the predefined set of precoding matrices, as shown in the following table.

| n | $Z_n$ |
|---|---|
| 0 | $\begin{bmatrix} 1 & 1 & 1 \\ 1 & 1 & -1 \\ 1 & -1 & 1 \\ -1 & 1 & 1 \end{bmatrix}$ |

-continued

| n | $Z_n$ |
|---|---|
| 1 | $\begin{bmatrix} 1 & 1 & -1 \\ 1 & 1 & 1 \\ -1 & 1 & 1 \\ 1 & -1 & 1 \end{bmatrix}$ |

-continued

| n | $Z_n$ |
|---|---|
| 2 | $\begin{bmatrix} 1 & -1 & 1 \\ -1 & 1 & 1 \\ 1 & 1 & 1 \\ 1 & 1 & -1 \end{bmatrix}$ |
| 3 | $\begin{bmatrix} 1 & -1 & -1 \\ -1 & 1 & -1 \\ -1 & -1 & 1 \\ -1 & -1 & -1 \end{bmatrix}$ |

Figure 2:
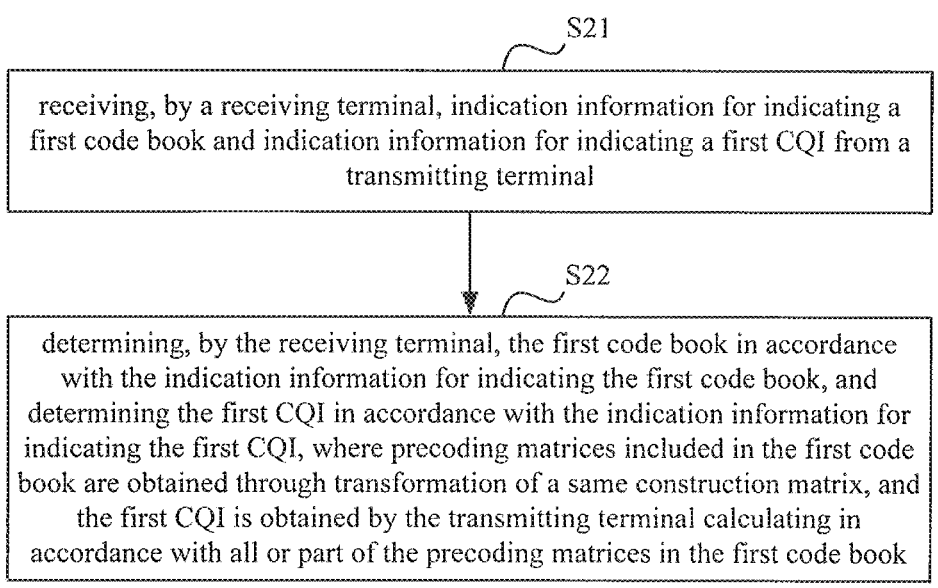
FIG. 2 is a schematic diagram of a method for receiving feedback information according to some embodiments of the present disclosure.

Based on an identical inventive concept, the present disclosure further provides in some embodiments a method for receiving feedback information which, as shown in FIG. 2, includes:

step S21 of receiving, by a receiving terminal, indication information for indicating a first code book and indication information for indicating a first CQI from a transmitting terminal; and step S22 of determining, by the receiving terminal, the first code book in accordance with the indication information for indicating the first code book, and determining the first CQI in accordance with the indication information for indicating the first CQI, where precoding matrices included in the first code book are obtained through transformation of a same construction matrix, and the first CQI is obtained by the transmitting terminal calculating in accordance with all or part of the precoding matrices in the first code book.

In the embodiments of the present disclosure, the indication information about the first code book may refer to that mentioned in the above embodiments, and thus will not be particularly defined herein.

The above method may be implemented by a software program, which may be stored in a storage medium. When the software program is called, the above-mentioned steps are performed.

Figure 3:
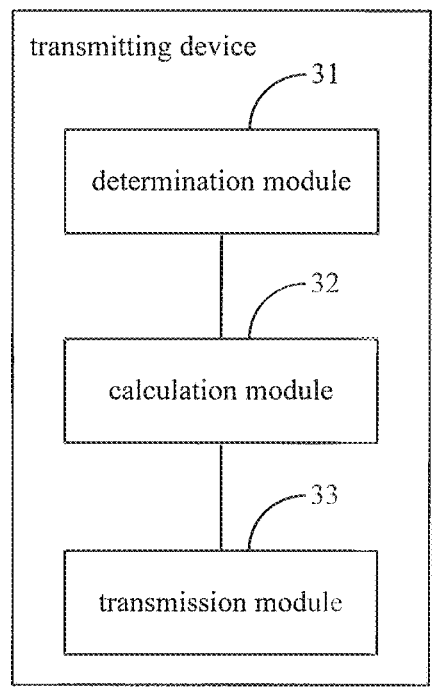
FIG. 3 is a schematic diagram of a device for transmitting feedback information according to some embodiments of the present disclosure.

Based on an identical inventive concept, the present disclosure further provides in some embodiments a device for transmitting feedback information which, as shown in FIG. 3, includes:

a determination module 31 configured to determine a first code book in accordance with a channel measurement result, where precoding matrices included in the first code book are obtained through transformation of a same construction matrix;

a calculation module 32 configured to calculate to obtain a first CQI in accordance with all or part of the precoding matrices in the first code book; and a transmission module 33 configured to transmit first indication information for indicating the first code book and second indication information for indicating the first CQI to a receiving terminal.

In a possible embodiment of the present disclosure, the calculation module 32 is further configured to:

select a precoding matrix for each RE from the first code book as a first precoding matrix for the RE, and with respect to each first sub-band, calculate to obtain the first CQI corresponding to the first sub-band in accordance with the first precoding matrix for the RE included in the first sub-band.

In a possible embodiment of the present disclosure, the determination module 31 is further configured to:

select a second precoding matrix from a predefined second code book in accordance with the channel measurement result, take the second precoding matrix as the construction matrix, and determine the first code book in accordance with the second precoding matrix, where the first indication information is identification information about the second precoding matrix.

In a possible embodiment of the present disclosure, the determination module 31 is further configured to:

perform a column exchange on a column vector of the second precoding matrix, and determine a set of the resultant matrices obtained through the column exchange as the first code book; and/or perform a predetermined operation on the second precoding matrix with the matrices in a predetermined set of matrices, and determine a set of the resultant matrices obtained through the predetermined operation as the first code book; and/or decompose the second precoding matrix into at least two component matrices, perform a predetermined operation on at least one of the at least two component matrices with the matrices in the predetermined set of matrices, and determine a set of the resultant matrices obtained through the predetermined operation as the first code book.

In a possible embodiment of the present disclosure, the determination module 31 is further configured to select a set of precoding matrices from a predefined set of precoding matrices in accordance with the channel measurement result, as the first code book. The first indication information is index information about the first code book in the predefined set of precoding matrices.

In a possible embodiment of the present disclosure, the determination module 31 is further configured to: select a set of precoding matrices from a predefined set of precoding matrices in accordance with the channel measurement result; and select a sub-set of precoding matrices from the selected set of precoding matrices in accordance with the channel measurement result, and determine the selected sub-set of precoding matrices as the first code book. The first indication information includes index information about the selected set of precoding matrices in the predefined set of precoding matrices, and index information about the selected sub-set of precoding matrices in the selected set of precoding matrices.

In a possible embodiment of the present disclosure, the calculation module 32 is further configured to select a precoding matrix from the first code book in accordance with the channel measurement result, as a third precoding matrix, and calculate to obtain a second CQI in accordance with the third precoding matrix. The transmission module 33 is further configured to transmit identification information about the third precoding matrix and information about the second CQI to the receiving terminal.

Figure 4:
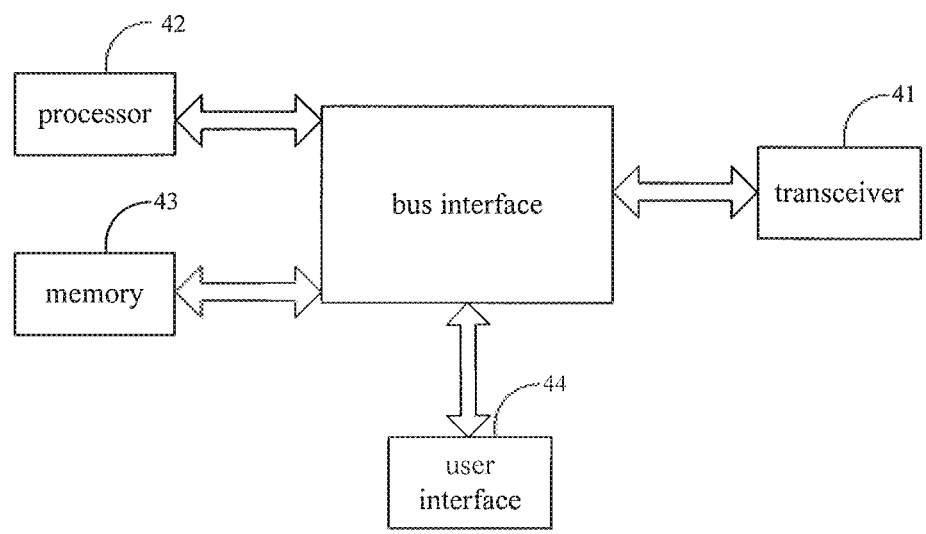
FIG. 4 is a schematic diagram of a terminal according to some embodiments of the present disclosure.

Based on an identical inventive concept, the present disclosure further provides in some embodiments a terminal which, as shown in FIG. 4, includes a transmitter 41 and at least one processor 42 connected to the transmitter 41. The processor 42 is configured to read a program stored in a memory 43, so as to:

determine a first code book in accordance with a channel measurement result, precoding matrices included in the first code book being obtained through transformation of an identical construction matrix; calculate to obtain a first CQI in accordance with all or part of the precoding matrices in the first code book; and transmit through the transmitter 41 first indication information about the first code book and second indication information about the first CQI to a receiving terminal.

In FIG. 4, bus architecture may include a number of buses and bridges connected to each other, so as to connect various circuits for one or more processors 42 and one or more memories 43. In addition, as is known in the art, the bus architecture may be used to connect any other circuits, such as a circuit for a peripheral device, a circuit for a voltage stabilizer and a power management circuit. Bus interfaces are provided, and the transceiver 41 is provided for communication with any other devices over a transmission medium. With respect to different user equipment (UE), a user interface 44 may also be provided for devices which are to be arranged inside or outside the UE, and these devices may include but not limited to a keypad, a display, a speaker, a microphone and a joystick.

The processor 42 may take charge of managing the bus architecture as well general processings. The memory 43 may store therein data for the operation of the processor 42.

In a possible embodiment of the present disclosure, the processor 42 is further configured to select a precoding matrix for each RE from the first code book as a first precoding matrix for the RE, and with respect to each first sub-band, calculate to obtain the first CQI corresponding to the first sub-band in accordance with the first precoding matrix for the RE included in the first sub-band.

In a possible embodiment of the present disclosure, the processor 42 is further configured to select a second precoding matrix from a predefined second code book in accordance with the channel measurement result, take the second precoding matrix as the construction matrix, and determine the first code book in accordance with the second precoding matrix. The first indication information is identification information about the second precoding matrix.

In a possible embodiment of the present disclosure, the processor 42 is further configured to: perform a column exchange on a column vector in the second precoding matrix, and determine a set of the resultant matrices obtained through the column exchange as the first code book; and/or perform a predetermined operation on the second precoding matrix with matrices in a predetermined set of matrices, and determine a set of the resultant matrices obtained through the predetermined operation as the first code book; and/or decompose the second precoding matrix into at least two component matrices, perform a predetermined operation on at least one of the at least two component matrices with the matrices in the predetermined set of matrices, and determine a set of the resultant matrices obtained through the predetermined operation as the first code book.

In a possible embodiment of the present disclosure, the processor 42 is further configured to select a set of precoding matrices from the predefined set of precoding matrices in accordance with the channel measurement result, as the first code book. The first indication information is index information about the first code book in the predefined set of precoding matrices.

In a possible embodiment of the present disclosure, the processor 42 is further configured to: select a set of precoding matrices from a predefined set of precoding matrices in accordance with the channel measurement result; and select a sub-set of precoding matrices from the selected set of precoding matrices in accordance with the channel measurement result, and determine the selected sub-set of precoding matrices as the first code book. The first indication information includes index information about the selected set of precoding matrices in the predefined set of precoding matrices, and index information about the selected sub-set of precoding matrices in the selected set of precoding matrices.

In a possible embodiment of the present disclosure, the processor 42 is further configured to select a precoding matrix from the first code book in accordance with the channel measurement result, as a third precoding matrix, calculate to obtain a second CQI in accordance with the third precoding matrix, and transmit trough the transmitter identification information about the third precoding matrix and information about the second CQI to the receiving terminal.

Figure 5:
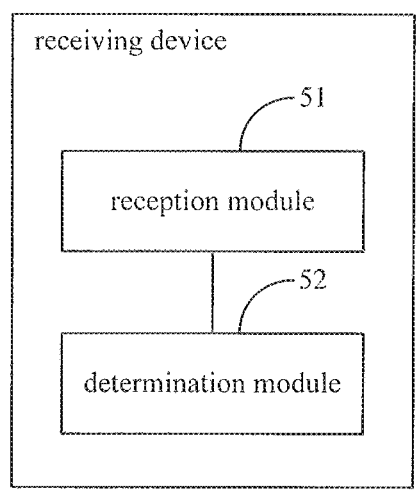
FIG. 5 is a schematic diagram of a device for receiving feedback information according to some embodiments of the present disclosure.

Based on an identical inventive concept, the present disclosure further provides in some embodiments a device for receiving feedback information which, as shown in FIG. 5, includes: a reception module 51 configured to receive indication information about a first code book and indication information about a first CQI from a transmitting terminal; and a determination module 52 configured to determine the first code book in accordance with the indication information about the first code book, and determine the first CQI in accordance with the indication information about the first CQI. Precoding matrices included in the first code book are obtained through transformation of an identical construction matrix, and the first CQI is obtained by calculating by the transmitting terminal in accordance with all or part of the precoding matrices in the first code book.

In the embodiments of the present disclosure, the indication information about the first code book may refer to that mentioned above, and thus will not be particularly defined herein.

Figure 6:
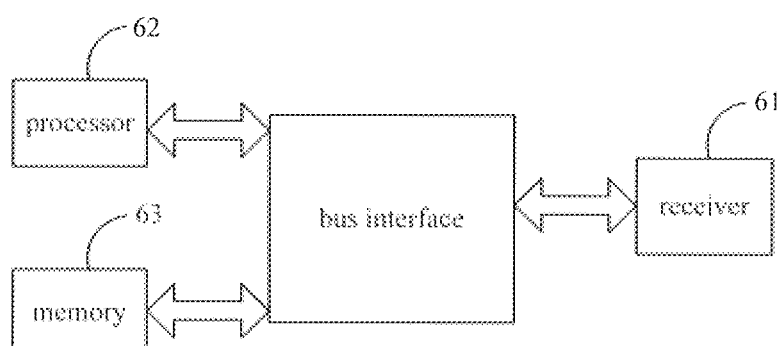
FIG. 6 is a schematic diagram of a base station according to some embodiments of the present disclosure.

Based on an identical inventive concept, the present disclosure further provides in some embodiments a base station which, as shown in FIG. 6, includes a receiver 61 and at least one processor 62 connected to the receiver 61. The processor 62 is configured to read a program stored in a memory 63, so as to: receive through the receiver 61 indication information about a first code book and indication information about a first CQI from a transmitting terminal; and determine the first code book in accordance with the indication information about the first code book, and determine the first CQI in accordance with the indication information about the first CQI. Precoding matrices included in the first code book are obtained through transformation of an identical construction matrix, and the first CQI are obtained by the transmitting terminal calculating in accordance with all or part of the precoding matrices in the first code book.

In FIG. 6, bus architecture may include a number of buses and bridges connected to each other, so as to connect various circuits for one or more processors 62 and one or more memories 63. In addition, as is known in the art, the bus architecture may be used to connect any other circuits, such as a circuit for a peripheral device, a circuit for a voltage stabilizer and a power management circuit. Bus interfaces are provided, and the receiver 61 is provided for communication with any other devices over a transmission medium. The processor 62 may take charge of managing the bus architecture as well general processings. The memory 63 may store therein data far the operation of the processor 62.

In the embodiments of the present disclosure, the indication information about the first code book may refer to that mentioned in the above embodiments, and thus will not be particularly defined herein.

It should be appreciated by those skilled in the art that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, Compact Disc-Read Only Memory (CD-ROM) and optical memory) including a computer-readable program code.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Although the optional embodiments are described above, a person skilled in the art may make modifications and alterations to these embodiments in accordance with the basic concept of the present disclosure. So, the attached claims are intended to include the optional embodiments and all of the modifications and alterations that fall within the scope of the present disclosure.

Obviously, a person skilled in the art may make various modifications and variations without departing from the spirit of the present disclosure, and the present disclosure is intended to include these modifications and variations if these fall within the scope of claims of the present disclosure and equivalents thereof.

What is claimed is:

1. A method for transmitting feedback information, comprising:
   determining, by a transmitting terminal, a first code book in accordance with a channel measurement result, wherein precoding matrices comprised in the first code book are obtained through transformation of a same construction matrix;
   calculating, by the transmitting terminal, to obtain a first Channel Quality Indicator (CQI) in accordance with all or part of the precoding matrices in the first code book; and
   transmitting, by the transmitting terminal, first indication information for indicating the first code book and second indication information for indicating the first CQI to a receiving terminal.

2. The method according to claim 1, wherein the calculating, by the transmitting terminal, to obtain the first CQI in accordance with all or part of the precoding matrices in the first code book comprises:
   selecting, by the transmitting terminal, a precoding matrix for each Resource Element (RE) from the first code book as a first precoding matrix for the RE; and
   for each first sub-band, calculating, by the transmitting terminal, to obtain the first CQI corresponding to the first sub-band in accordance with the first precoding matrix for the RE comprised in the first sub-band.

3. The method according to claim 1, wherein the determining, by the transmitting terminal, the first code book in accordance with the channel measurement result comprises:
   selecting, by the transmitting terminal, a second precoding matrix from a predefined second code book in accordance with the channel measurement result; and
   taking, by the transmitting terminal, the second precoding matrix as the construction matrix, and determining the first code book in accordance with the second precoding matrix,
   wherein the first indication information is identification information of the second precoding matrix.

4. The method according to claim 3, wherein the determining, by the transmitting terminal, the first code book in accordance with the second precoding matrix comprises:
   performing, by the transmitting terminal, a column exchange on a column vector of the second precoding matrix, and determining a set of the matrices obtained through the column exchange as the first code book; and/or
   performing, by the transmitting terminal, a predetermined operation on the second precoding matrix with the set of the matrices in a predetermined set of matrices, and determining a set of the matrices obtained through the predetermined operation as the first code book; and/or
   decomposing, by the transmitting terminal, the second precoding matrix into at least two component matrices, performing a predetermined operation on at least one of the at least two component matrices with the set of the matrices in the predetermined set of matrices, and determining a set of the matrices obtained through the predetermined operation as the first code book.

5. The method according to claim 1, wherein the determining, by the transmitting terminal, the first code book in accordance with the channel measurement result comprises:
   selecting, by the transmitting terminal, a set of precoding matrices from a predefined set of precoding matrices in accordance with the channel measurement result, as the first code book, and wherein the first indication information is index information about the first code book in the predefined set of precoding matrices.

6. The method according to claim 1, wherein the determining, by the transmitting terminal, the first code book in accordance with the channel measurement result comprises:
   selecting, by the transmitting terminal, a set of precoding matrices from a predefined set of precoding matrices in accordance with the channel measurement result; and
   selecting, by the transmitting terminal, a sub-set of precoding matrices from the selected set of precoding matrices in accordance with the channel measurement result, and determining the selected sub-set of precoding matrices as the first code book,
   wherein the first indication information comprises: index information about the selected set of precoding matrices in the predefined set of precoding matrices, and index information about the selected sub-set of precoding matrices in the selected set of precoding matrices.

7. The method according to claim 1, further comprising:
   selecting, by the transmitting terminal, a precoding matrix from the first code book in accordance with the channel measurement result, as a third precoding matrix;
   calculating, by the transmitting terminal, to obtain a second CQI in accordance with the third precoding matrix; and
   transmitting, by the transmitting terminal, identification information about the third precoding matrix and information about the second CQI to the receiving terminal.

8. A method for receiving feedback information, comprising receiving, by a receiving terminal, indication information for indicating a first code book and indication information for indicating a first Channel Quality Indicator (CQI) from a transmitting terminal; and determining, by the receiving terminal, the first code book in accordance with the indication information for indicating the first code book, and determining the first CQI in accordance with the indication information for indicating the first CQI, wherein precoding matrices comprised in the first code book are obtained through transformation of a same construction matrix, and the first CQI is obtained by the transmitting terminal calculating in accordance with all or part of the precoding matrices in the first code book.

9. The method according to claim 8, wherein the indication information about the first code book is identification information for indicating a second precoding matrix, and the second precoding matrix is selected by the transmitting terminal from a predefined second code book in accordance with a channel measurement result; or the indication information about the first code book is index information about the first code book in a predefined set of precoding matrices; or the indication information about the first code book comprises: index information about a set of precoding matrices selected by the transmitting terminal in the predefined set of precoding matrices, and index information about a sub-set of precoding matrices selected by the transmitting terminal in the selected set of precoding matrices.

10. A device for transmitting feedback information, comprising a transmitter and at least one processor connected to the transmitter, wherein when a program stored in a memory is read by the processor, the processor is configured to:

determine a first code book in accordance with a channel measurement result, wherein precoding matrices comprised in the first code book are obtained through transformation of a same construction matrix;

calculate to obtain a first Channel Quality Indicator (CQI) in accordance with all or part of the precoding matrices in the first code book; and transmit first indication information for indicating the first code book and second indication information for indicating the first CQI to a receiving terminal.

11. The device according to claim 10, wherein the processor is further configured to select a precoding matrix for each Resource Element (RE) from the first code book as a first precoding matrix for the RE, and for each first sub-band, calculate to obtain the first CQI corresponding to the first sub-band in accordance with the first precoding matrix for the RE comprised in the first sub-band.

12. The device according to claim 10, wherein the processor is further configured to select a second precoding matrix from a predefined second code book in accordance with the channel measurement result, take the second precoding matrix as the construction matrix, and determine the first code book in accordance with the second precoding matrix, wherein the first indication information is identification information about the second precoding matrix.

13. The device according to claim 12, wherein the processor is further configured to:

perform a column exchange on a column vector of the second precoding matrix, and determine a set of the matrices obtained through the column exchange as the first code book; and/or perform a predetermined operation on the second precoding matrix with the set of the matrices in a predetermined set of matrices, and determine a set of the matrices obtained through the predetermined operation as the first code book; and/or decompose the second precoding matrix into at least two component matrices, perform a predetermined operation on at least one of the at least two component matrices with the set of the matrices in the predetermined set of matrices, and determine a set of the matrices obtained through the predetermined operation as the first code book.

14. The device according to claim 10, wherein the processor is further configured to select a set of precoding matrices from a predefined set of precoding matrices in accordance with the channel measurement result, as the first code book, and wherein the first indication information is index information about the first code book in the predefined set of precoding matrices.

15. The device according to claim 10, wherein the processor is further configured to:

select a set of precoding matrices from a predefined set of precoding matrices in accordance with the channel measurement result; and select a sub-set of precoding matrices from the selected set of precoding matrices in accordance with the channel measurement result, and determine the selected sub-set of precoding matrices as the first code book, and wherein the first indication information comprises: index information about the selected set of precoding matrices in the predefined set of precoding matrices, and index information about the selected sub-set of precoding matrices in the selected set of precoding matrices.

16. The device according to claim 10, wherein the processor is further configured to select a precoding matrix from the first code book in accordance with the channel measurement result, as a third precoding matrix, and calculate to obtain a second CQI in accordance with the third precoding matrix, and wherein the processor is further configured to transmit identification information about the third precoding matrix and information about the second CQI to the receiving terminal.

* * * * *